June 1, 1926.
A. F. GLAESSNER
1,587,226
GAS COCK LOCKING DEVICE FOR GAS RANGES
Filed Feb. 3, 1925
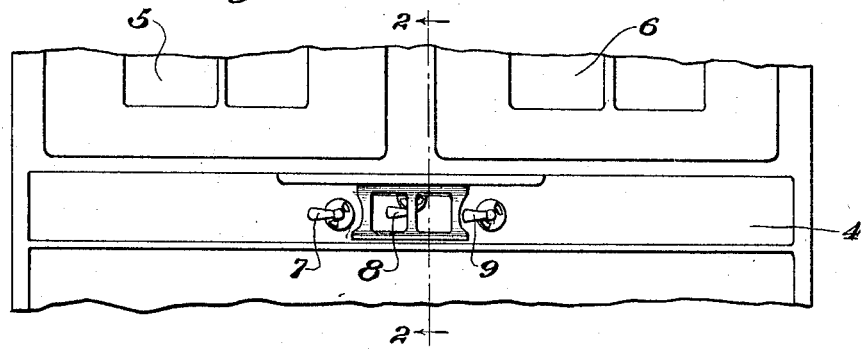
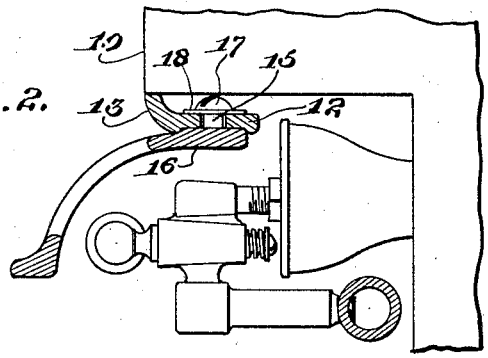
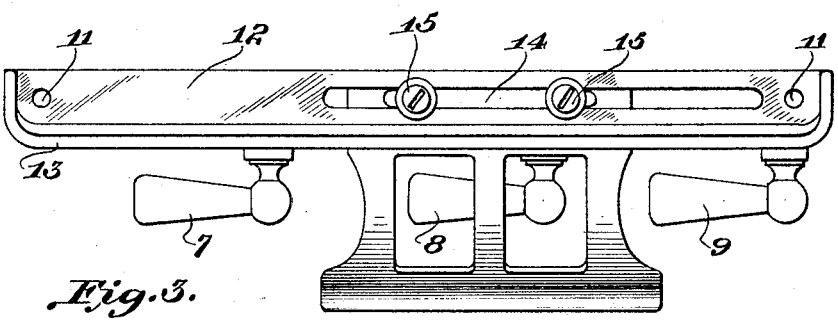
Inventor
Aurthur F. Glaessner
By Mason Fenwick & Lawrence.
Attorneys Patented June 1, 1926.

1,587,226

UNITED STATES PATENT OFFICE.

ARTHUR F. GLAESSNER, OF MERIDEN, CONNECTICUT, ASSIGNOR OF ONE-HALF TO THE UNION STOVE WORKS, OF NEW YORK, N. Y., A CORPORATION OF NEW YORK.

GAS-COCK-LOCKING DEVICE FOR GAS RANGES.

Application filed February 3, 1925. Serial No. 6,635.

My invention relates particularly to the gas cocks employed in gas ranges for controlling the gas supply to the broiler and oven burners, and has for its primary object to prevent the broiler cock from being turned when the oven cock is in use and the oven cock from being turned when the broiler cock is in use.

To this end my invention consists in its entirety of a locking plate arranged to slide over, bar and lock the handle of the broiler gas cock and at the same time uncover and unlock the oven gas cock, and to slide over, bar and lock the oven gas cock as it uncovers and unlocks the broiler gas cock, all substantially as hereafter described and claimed.

In order that my invention may be fully understood, I shall first describe in detail the mode in which I at present prefer to carry the invention into practice and then distinctly claim the same.

Reference is to be had to the accompanying drawings forming part of this specification in which like parts are designated by the same numbers in all the figures.

Figure 1 is a front elevation showing part of a gas range, the oven and broiler gas cocks thereon, and a locking device embodying my invention applied to the broiler and oven gas cocks, the broiler cock being shown covered and locked and the oven cock uncovered and unlocked.

Figure 2 is a cross sectional view of the same on the line 2—2, Figure 1.

Figure 3 is a plan view of the locking device detached from the range.

In the drawings, 4 designates the breast of a gas range; 5 the left upper oven; 6 the right upper oven containing also the broiler; 7 the gas cock controlling the gas supply to the burner of the left oven 5; 8 the gas cock controlling the gas supply to the broiler burner, and 9 the gas cock controlling the gas supply to the right oven, the three gas cocks 7, 8 and 9 being preferably arranged in a short row below the oven 5 and 6, so that their handles all swing upward and to the right in the vertical plane to open them.

To lock and unlock the broiler and oven gas cocks 8 and 9 in alternation as desired and previously set forth, I prefer to cast a narrow horizontal overhanging ledge 10 along the breast of the burner, and fasten to the underside thereof by screws 11, a similar narrow horizontal plate 12, having a flange 13 along its front edge, to bear upward against the ledge 10, and a longitudinal slot 14. In the slot 14 are mounted to ride studs 15 formed on the upper side of a plate 16, arranged to slide lengthwise along the underside of the fixed plate 12, and sustained thereagainst by screws 17, entering the studs 15 and washers 18 on the screws above the fixed plate 12.

The sliding plate 16 is extended forward and downward over the line of and into the turning paths of the handles of the gas cocks 8 and 9, so that when the sliding plate is moved to the position shown in Figure 1 it will cover, bar and lock the broiler cock 8, against turning upward, and at the same time uncover and free the oven cock 9 for use, and when the sliding plate 16 is shifted to the right it will cover, bar and lock the oven cock 9 against turning upward, and at the same time uncover and free the broiler cock 8 for use.

The opening of either cock is thus effectually prevented when the other is in use.

The downward extension of the sliding plate 16 is preferably formed skeleton like with two openings on either side of an upright central portion which serves as a handle for shifting it.

I claim as my invention:—

1. The combination with the gas range having a pair of gas cocks thereon, and a horizontal ledge overhanging the pair of gas cocks, of a guide fixed to the underside of said ledge and formed with a longitudinal slot, and a sliding plate having studs riding in said slot and extended outward and downward over the handles of the gas cocks into the turning paths of the same so as to cover and lock either cock against turning while uncovering and unlocking the other cock.

2. The combination with the body of a gas range having a pair of gas cocks thereon, of a guide fixed to the range body and formed with a slot, and a sliding plate having projections thereon riding in said slot and mounted so as to extend into the turning paths of the handles of said gas cocks, so as to lock either handle while unlocking the other.

In testimony whereof I affix my signature.

ARTHUR F. GLAESSNER.